United States Patent
Kramer

(10) Patent No.: US 7,045,023 B1
(45) Date of Patent: May 16, 2006

(54) PROCESS FOR TREATING WIPER BLADES

(75) Inventor: Ronald A. Kramer, Dubin, OH (US)

(73) Assignee: Bandon Corporation, Dublin, OH (US)

( * ) Notice: Subject to any disclaimer, the term of this patent is extended or adjusted under 35 U.S.C. 154(b) by 950 days.

(21) Appl. No.: 08/665,491

(22) Filed: Jun. 18, 1996

(51) Int. Cl.
B08B 3/00 (2006.01)

(52) U.S. Cl. .............................. 134/39; 134/40; 134/42
(58) Field of Classification Search ..................... 134/6, 134/3, 38, 39, 40, 42
See application file for complete search history.

(56) References Cited

U.S. PATENT DOCUMENTS

| 1,114,841 | A | | 10/1914 | Wright |
|---|---|---|---|---|
| 2,622,038 | A | | 12/1952 | Charlesworth et al. |
| 3,345,348 | A | | 10/1967 | Tennehouse |
| 3,546,825 | A | | 12/1970 | Dale |
| 3,591,410 | A | | 7/1971 | Ross |
| 3,956,174 | A | | 5/1976 | Palcher |
| 3,978,010 | A | * | 8/1976 | Bright et al. |
| 3,997,935 | A | | 12/1976 | Porter et al. |
| 3,998,643 | A | * | 12/1976 | Liddle |

* cited by examiner

Primary Examiner—Jeffrey Snay
(74) Attorney, Agent, or Firm—Hudak, Shunk & Farine Co. LPA

(57) ABSTRACT

Various rubbers, thermoplastic elastomers, and plastics can be cleaned with an acid (inorganic or organic) or a salt thereof to extend the useful life of the material. A desired end use for the material is a vehicle wiper blade. Alkyl or aromatic sulfonic acids are desired due to their ability to clean and regenerate a used wiper blade as well as to reduce streaking. Residual alkyl or aromatic sulfonic acid left on the blade can help to retard later build-up of oil and dirt on the blade.

6 Claims, 1 Drawing Sheet

PROCESS FOR TREATING WIPER BLADES

FIELD OF THE INVENTION

The present invention relates to the treatment of rubber, thermoplastic elastomer or plastic compositions such as squeegees and mechanized wiper blades, e.g., automotive, to remove contaminants and reduce streaking of windows as well as to extend the useful service life of the wiper blade.

BACKGROUND OF THE INVENTION

Once placed in service on a vehicle, wiper blades tend to pick up oil, grime, dirt and other environmental contaminants from the road, rain, and the air which are deposited on the surfaces which the wiper blades wipe. Furthermore, non-soluble plasticizers and other formulation components used in the rubber manufacture may leach to the blade surface. The superficial presence of these contaminants on the wiper blade and windshield can cause or aggravate a common form of wiper blade streaking, which is typically temporarily visible on the windshield after each wipe of the blade.

While Dale, U.S. Pat. No. 3,546,825 teaches the use of a rubber thinner and cleaning material in conjunction with rubbing the wiper blade with an abrasive material, such abrading treatment causes undue damage to the wiping surface of the blade, resulting in a shortened blade life. The cleaning material used in Dale was apparently not sufficient in itself to recondition a wiper blade without surface abrading.

Heretofore, a premoistened towelette impregnated with isopropanol and surfactants has been used for cleaning dirty wiper blades. It is not very effective in reducing streaking of the type described above.

Graphite has also been utilized on windshield wiper blades to lubricate the same with regard to friction abatement with the windshield. The graphite often dirtied the window and did not reduce streaking.

Another known product applies graphite to a windshield wiper in a container which has a porous sponge applicator containing a groove therein. The graphite which is generally contained in a liquid penetrates the entire porous applicator. While lubricating the blade, it does not reduce streaking.

SUMMARY OF THE INVENTION

The invention in general relates to the treatment and conditioning of various rubber, thermoplastic elastomer and plastic substrates. More specifically, the invention relates to an applicator for and a process of treating a wiper blade or other natural or synthetic rubber surface or a thermoplastic elastomer or plastic with a composition which contains an acid, either an organic acid or a salt thereof, or an inorganic acid. The composition is used alone or in combination with one or more diluents, solvents, penetrating agents, surfactants, plasticizers, thickeners, co-acids, lubricants, neutralizers, preservatives or rubber protectants. A preferred applicator is a non-abrasive pad or block having one surface wetted with preferably an alkyl or an aromatic sulfonic acid or salt thereof and one or more non-wetted surfaces which can be used for holding the applicator. Some of the composition of the present invention can migrate from the wiper blade to the windshield during operation of the wiper, thereby cleaning the windshield. The use of the acid composition or salt thereof has the advantage of reducing wiper blade streaking by removing oil, dirt, grime and other contaminants from the wiper blade and the windshield.

It is thus an object of the present invention to easily remove contaminants from the blade wiping surface without the necessity of removing the blade from its holder or the vehicle, thereby extending the life of a wiper blade.

It is another object of the present invention to provide a treatment for a rubber, a thermoplastic elastomer, or a plastic surface such as a wiper blade which reduces streaking on a substrate such as glass and results in improved removal of contaminates.

DETAILED DESCRIPTION OF THE INVENTION

Figure 1:
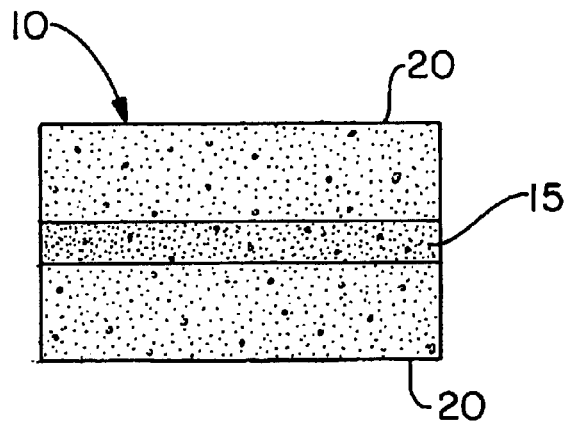
FIG. 1 is a top view.

A water soluble or water miscible acid, which is either an organic acid or an inorganic acid, or a salt of the organic acid is an essential component in the treatment and conditioning of the various rubber, thermoplastic elastomer, and plastic substrates, as, for example, in the form of a wiper blade. Considering the inorganic acids, they generally include any acids which are not unduly dangerous or harmful to persons or the environment, and exclude dangerous acids such as arsenic acid. Examples of useful acids include hydrochloric acid, hydrobromic acid, hydriodic acid, hydrosulfuric acid, perchloric acid, chloric acid, chlorous acid, hypochlorous acid, boric acid, silicic acid, nitric acid, nitrous acid, sulfuric acid, sulfurous acid, phosphoric acid, phosphorous acid, permanganic acid, chromic acid, dichromic acid, and the like. In lieu of inorganic acids, various organic acids, saturated or unsaturated, can be utilized generally having a total of from 1 to 36 carbon atoms and 1 to 4 acid groups (i.e. monocarboxylic, dicarboxylic, etc.), with specific examples including formic acid, acetic acid, propionic acid, n-butyric acid, isobutyric acid, n-valeric acid, isovaleric acid, methylethylacetic acid, trimethylacetic acid, caproic acid, heptoic acid, caprylic acid, pelargonic acid, capric acid, undecylic acid, lauric acid, myristic acid, palmitic acid, margaric acid, stearic acid, citric acid, oxalic acid, malonic acid, succinic acid, glutaric acid, adipic acid, pimelic acid, suberic acid, azelaic acid, maleic acid, fumaric acid, acrylic acid, crotonic acid, and the like.

Alternatively, various salts or partial salts of the organic acids can be utilized. That is, salts of organic acids can be utilized where the hydrogen atom of the acid has been replaced by a metal, either partially or wholly with regard to all of the organic acid molecules. Thus, anywhere from about 1 percent to 100 percent of all of the organic acid molecules can be reacted and/or neutralized by a metal or an amine compound. Desired salts of inorganic acids, either partial or totally reacted and/or neutralized, are derived from a metal, e.g., an alkali metal such as sodium or potassium, or an amine compound. To neutralize the acid, generally bases such as NaOH, KOH, etc., can be used to adjust the pH of the acid to obtain the desired results with a particular rubber. For example, the pH of a preferred acid, linear dodecyl sulfonic acid has a pH of approximately 1.0, which can be adjusted upward with the addition of NaOH if desired. Certain acid neutralizers, such as NaOH can also be used to thicken the acid. Desirably, the acids are partially neutralized acids of the present invention and have a pH of generally less than 7, desirably less than 6.5, 6.0, 5.0, or 4.0, and preferably from about 0.5 or 0.75 to about 3.0.

Sulfonic acids are generally preferred because they generally perform well, and they do not usually harden or harm rubber, damage auto paint, or burn skin. Of the sulfonic acids, aromatic sulfonic acids are generally preferred since they are more effective and stable than other sulfonic acids, and will break down less in storage, which is an important feature in maximizing shelf life. Sulfonic acids contain at least one sulfo group, typically $SO_3H$.

The alkyl sulfonic acids include compounds of the formula

 Formula I where $R^1$ is a branched, linear, or cyclic alkyl containing a total of from 1 to about 36 carbon atoms, and preferably from about 8 to about 24 carbon atoms.

Especially suitable in the present invention are aromatic sulfonic acids which include mono, di, and poly alkyl substituted aromatic sulfonic acids. Included within the definition of aromatic sulfonic acids also are one (e.g., benzene) or two (e.g., naphthalene) etc., aromatic rings. A desired aromatic compound can be represented by the formula

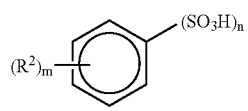 Formula II where m is 1, 2, 3, or 4 and n is 1, 2, 3, or 4 with the proviso that m+n is 6 or less. Each $R^2$ is an alkyl or a substituted alkyl group containing from 1 to about 30 carbon atoms, desirably from about 4 to about 24 carbon atoms, more desirably from about 9 to about 13 carbon atoms, and optimally from about 11 to about 13 carbon atoms. Substituted groups include halogen, nitro, alcohol, carbonyl, or carboxyl, etc. As noted above, salts of the above sulfonic acids can also be utilized. Small amounts of sulfuric acid, usually about 1 to 4 percent by weight, are also typically present as a consequence of the commercial preparation of the sulfonic acid.

As shown in the examples, a number of commercially available aromatic sulfonic acids may be used with beneficial results. However, some forms of sulfonic acid are not suitable, such as chlorosulfonic acids which produce unacceptable amounts of hydrochloric and sulfuric acids when combined with water and thus could damage vehicle paint. Sulfonic acids which are unstable or not water miscible also are not suitable for the present invention.

In accordance with the present invention, with respect to the Formula II compound, it is desirable to have over eight carbons in the alkyl group(s) in order to achieve oil solubility, which oil solubility then increases or decreases with the number of carbon atoms. However, water solubility starts to decrease as the number of carbon atoms exceeds about 13. The highest number of carbon atoms known to the inventor as being commercially available is 24, consisting of two groups of 12 carbon atoms each. The resulting composition exhibits both desirable water solubility from the acid portion and oil solubility from the alkyl (hydrocarbon) group(s) or a substituted group thereof, e.g., an alcohol group. Accordingly, compositions containing aromatic sulfonic acids having one or more linear, branched, or cyclic alkyl substituted chains containing from 9 to 24, or more preferably 9 to 13 carbon atoms have been shown to be most effective in reducing wiper blade streaking. A highly preferred aromatic acid is linear dodecyl benzene sulfonic acid, $C_{12}H_{25}$—$C_6H_4$—$SO_3H$, i.e., or blends of alkyl substituted aromatic sulfonic acids wherein the alkyl group has 11 to 13 carbon atoms. The various sulfonic acids are generally utilized neat, that is without the addition of any water since water would dilute the effectiveness of the wiper blade composition. Hence, the composition on a weight basis is substantially free of water, that is, contains less than 10 percent by weight, less than 5 percent by weight, less than 2 percent by weight, and nil, that is, totally free of thereof. As noted above, the wiper treatment composition of the present invention can also include various metal salts such as alkali salts or amine salts of sulfonic acids, or of alkyl substituted aromatic sulfonic acids wherein the alkyl group includes one or more alcohol groups, or partially neutralized sulfonic acids.

In addition to the one or more sulfonic acids, optionally, at least one acid, either organic or inorganic can be utilized therewith. The amount of such a co-acid will vary depending upon whether the acid is a strong acid, for example, sulfuric acid, hydrochloric acid, etc., or a weak acid such as carbonic acid, citric acid, ascorbic acid, acetic acid, and the like. However, when strong inorganic acids are utilized, they are desirably diluted with water so that they do not have a corrosive effect upon the wiper blade or the rubber, thermoplastic elastomer, or plastic substrate. Accordingly, the amount of inorganic acid by weight and water can range from about 1 percent up to 100 percent, i.e., wholly acid.

The various acids including the preferred aromatic sulfonic acids can be used with one or more additives such as diluents, solvents, penetrants, surfactants, plasticizers, thickeners, softeners, lubricants, preservatives, cyclic carbonyl containing compounds such as lactones or lactams, or acid neutralizers. Such additives are desirably fully soluble or miscible. Some partially or non-miscible additives may be incorporated, provided they can be additives may be incorporated, provided they can be made fully water reducible by the use of appropriate surfactants, acids, or solvents and further provided that the resulting combination does not have any non-miscible component that could allow a residue to remain in or on the blade once the surfactant, acid or solvents are rinsed away or evaporate.

The viscosity of sulfonic acid varies considerably with temperature, and the use of compatible diluents, solvents or viscosity modifiers, such as thickeners, may be appropriate to obtain an effective working viscosity for a particular ambient temperature and the type of rubber being treated. Compatible thickeners are zinc, sodium or aluminum stearate, stearic acid, acid neutralizers (such as NaOH, KOH, etc.), and $C_{16}$ or higher fatty alcohols, provided they are used in such proportions as to maintain their complete water miscibility at all ambient temperatures likely to be encountered in use (e.g. −20° C. to 45° C. or more and desirably from about−10° C. or 0° C. to 35° C.). At a temperature of 20° C., the preferred sulfonic acid solution is a thick liquid with a viscosity of at least 1300 cps. Such a viscosity, or an even thicker gel, is a desirable feature because it reduces drippage during the process of wiping the composition onto the rubber article such as a wiper blade.

Examples of solvents that may be used, depending upon the particular sulfonic acid, are aliphatic and aromatic

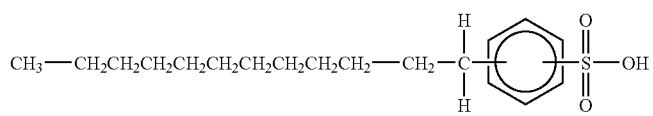

hydrocarbons such as alcohols, glycols, carboxylic acids, amino alcohols, nitriles, ketones, esters, ethers, glycol ethers, glycol ether esters, and mixtures thereof.

Penetrating agents include glycerine, glyceryl diricinoleate dimethylsulfoxide, trihydric alcohols such as 1,2,3-pentanetriol, dihydric alcohols such as ethylene glycol, propylene glycol, isobutylene glycol, B-butylene, 2,3 butanediol, γ-pentylene glycol, and the like. The penetrating agent should be water soluble and capable of penetrating into the pores of rubber or rubbery material.

Examples of preservatives include the various alginates such as potassium alginate, ammonium alginate, sodium alginate, potassium caseinate, and the like.

Diluents can include water or other water miscible liquids.

One or more cyclic compounds containing at least a carbonyl group therein can be utilized generally to soften the rubber. Such compounds typically include the various lactams which is a cyclic amide generally having from 5 to 12 carbon atoms, a lactone which is an inner ester of carboxylic acid having from 3 to 12 carbon atoms, such as propiolactone, butyrolactone, and the like, and various oxazolidinones, including alkyl substituted oxazolidinones at the 2 position wherein the alkyl has from 1 to 6 carbon atoms.

In geographical areas where subfreezing temperatures are common the composition is desirably formulated with organics or electrolytes to avoid solidification. Anionic, cationic, non-ionic, and amphoteric surfactants, and combinations thereof, may be used with particular sulfonic acids, although they should not normally be necessary due to the high inherent surfactancy of the preferred embodiments. Examples of other suitable surfactants are described in Cahn et al., "Surfactants and Detersive Systems," Kirk-Othmer, *Encyclopedia of Chemical Technology*, 3rd Ed., (1983) Vol. 22, pp. 332–432, and also in *McCutcheon's Emulsifiers and Detergents*, 1989 North American Edition, pp. 260–284.

The addition of plasticizers may soften certain rubbers, and thereby reduce wiper blade chattering. A large variety of rubber plasticizers are known in the art, and it is not intended to limit the scope of this invention to any particular one. Many plasticizing fatty alcohols and fatty acids are compatible with the preferred embodiment. The addition of a plasticizer to the preferred embodiment resulted in desirable softening. However, in all tested cases the incorporation of a non-water soluble plasticizer has actually increased wiper blade streaking, or at least reduced the effectiveness of the composition in reducing streaking. For this reason the preferred embodiment sulfonic acids intended for use on wiper blades do not incorporate non-water soluble plasticizer. Water soluble cyclic ketones such as lactones, lactams, or lower alkyl substituted 2-oxazolidinones may soften certain rubbers when combined with an alkyl or aromatic sulfonic acid.

Other optional additives are ultraviolet, oxygen, and ozone protectors and lubricants. Recognized antioxidants and antiozonants include p-phenylenediamine, phenoldiphenylamine, and modified thioester based antidegradants.

The above compositions of the present invention when applied to windshield wipers such as on automobiles has been found to substantially reduce streaking. The liquid compositions further have been found to extend windshield wiper life by preventing buildup of dirt, grime, and the like.

While the preferred embodiment of the present invention relates to the treatment and conditioning of windshield wipers, the compositions of the present invention can generally be applied to various types of rubbers, thermoplastic elastomers, or plastics. Various natural and synthetic elastomers include natural rubber, styrene-butadiene rubber, nitrile rubber, ethylene-propylene diene rubber, chloroprene, and the like. Typically, the rubber composition, particularly when it is natural rubber, will contain a reinforcing agent such as carbon black, a vulcanizing agent and other ingredients such as antioxidants, antiozonants, softeners and plasticizer oils. In lieu of rubber compositions, various thermoplastic elastomers can be utilized such as blends of polyester and acrylic rubber, blends of EPDM with either polyethylene or polypropylene, and the like. Moreover, various flexible plastic materials can be utilized such as various vinyl and vinylidene polymers such as polyvinyl chloride, plasticized polyvinyl chloride, polystyrene or copolymers thereof, acrylic polymers, polyvinyl esters such as polyvinyl acetate, and the like. Other plastics which can also be utilized include the various polyurethanes, the various polyesters, and the various polyolefins such as polyethylene, polypropylene, etc.

It is intended that the composition simply be wiped onto the surface of wiper blades or preferably other articles. The composition can also be applied during the process of manufacturing wiper blades or other articles by wiping, or by other methods such as spraying or dipping if the viscosity of the composition has been modified to accommodate the alternative application method. The composition can be allowed to dry, or be rinsed off with water or other compatible liquid after such period of time as necessary to achieve the desired degree of treatment. It is also desirable during or after the application that undesired dirt, grease and grime released from the surface of the wiper blade by the sulfonic acid are washed away.

Figure 2:
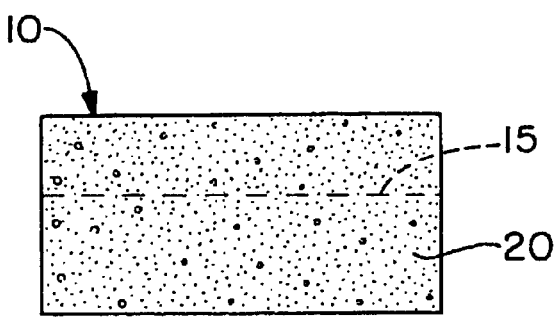
FIG. 2 is a side view.
Figure 3:
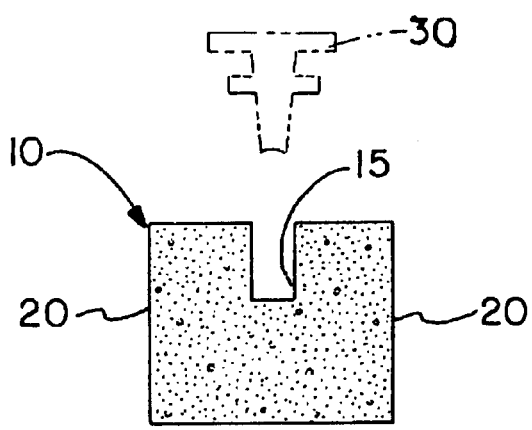
FIG. 3 is an end view of an applicator for applying a treatment composition to a wiper blade.

The wiper blade treatment composition can be applied by a variety of means that contact the wiping surface of the blade with the sulfonic acid. Desirably the treatment composition and applicator are compact enough to store in a vehicle so they are readily available to treat the wiper blades thereof. The applicator can be of any shape, such as a pad, that can be used to clean the wiper blades without their removal from the vehicle or their holders. A suitable pad 10 is shown in FIGS. 1, 2, and 3 wherein the pad has a portion thereof such as a surface, a depression, groove, or slot 15 which is capable of receiving a wiper blade 30. The pad is generally is a woven or non-woven (natural or synthetic), or a rubber or a thermoplastic elastomer, or a plastic (desirably foam and preferably a closed cell foam such as polyethylene), or a molded material, or any other material having a surface suitable for wiping rubber, thermoplastic elastomer or plastic articles without excessive abrasion. As sulfonic acids can remove desirable oils from one's skin it is desirable that the treatment composition is confined to preselected portions of the pad or applicator used to apply the composition. When the pad is a the preferred molded closed cell foam the treatment composition can be applied to one surface, e.g., the groove, slot, etc., and the non-applied surfaces, e.g., 20 can be used by the person using the pad to grip it. If the pad is a cellulosic or water absorbent woven or non-woven then a barrier film or layer on one or more surfaces can be applied and these surface(s) can be used for gripping while applying the composition. Naturally, such gripping surfaces are any non-acid applied surface. Thus, in the drawings, surfaces or body portion which are substantially free of the alkyl or aromatic sulfonic acid composition are all of the surfaces other than groove 15, that is, the side surfaces 20, the bottom surface, the two end surfaces, and the laterally outward portions of the top surface. By "substantially free" it is meant that any solution on such non-acid applied surface contains less than 30, 20 or 10 percent, desirably less than 5, 4, or 3, 2 or 1 percent, and preferably nil, that is, 0 percent by weight of the acid (or salt thereof) such as sulfonic acid based upon the total weight of the solution. Desirably, the applicator is used until it is contaminated with foreign material and then it is cleaned or discarded. The treatment composition can be applied to the applicator (renewed) at appropriate time intervals.

The invention will be better understood by reference to the following examples which serve to illustrate, but to limit the present invention.

EXAMPLES

A variety of wiper blades of various sizes, age, condition and manufacturer were obtained for evaluation using the examples shown below. Each blade was divided into 3 sections by small cuts through the wiping rubber in a direction perpendicular to the wiper's length. These cuts did not extend into the support structure, so that the blades could still function properly.

One section of each blade was left untreated as a control. The second section was treated with Example 11 below, the preferred embodiment, as a common reference. The third section was treated with the particular example under evaluation.

Each blade was in turn installed on the same vehicle and operated under a variety of mist and water sprays. The wipers were observed while in operation. A score from 1 go 10 was used to express the amount of streaking observed for each band, with 10 being no streaking and 1 being extreme streaking. Because each blade could be quite different from any other, only the relative scoring of the two treated sections as compared to the untreated section of that particular blade was considered relevant.

The following table shows the examples and their average streaking scores after taking into account the foregoing:

In each of the following examples "C" refers to the total number of carbon atoms in the alkyl groups of the substituted aromatic sulfonic acid.

| EXAMPLES: | A* | B* | C* | D* | E* | F* |
|---|---|---|---|---|---|---|
| 1. C1 Toluene sulfonic acid sold by Ruetgers-Nease as TSA | 3 | 8 | 3 | 5 | 0 | -5 |
| 2. C2 Xylene sulfonic acid sold by Ruetgers-Nease as XSA | 4 | 9 | 5 | 5 | 1 | -4 |
| 3. C1–C2 Toluene/xylene sulfonic acid sold by Witco Chemical as TX acid | 4 | 8 | 6 | 4 | 2 | -2 |
| 4. C6 Mono-dimethyl naphthalene sulfonic acid sold by Witco as AN acid | 2 | 7 | 3 | 5 | 1 | -4 |
| 5. C9 Alkyl sulfonic acid sold by Witco as D 5129 acid | 4 | 10 | 7 | 6 | 3 | -3 |
| 6. C9–C13 linear alkyl benzene sulfonic acid mixture (average C11.3), sold by Stephen Chemical as BioSoft S100 | 3 | 8 | 7 | 5 | 5 | 0 |
| 7. C10–C14 linear alkyl benzene sulfonic acid mixture (average C12), sold by Stephen Chemical as BioSoft S120 | 3 | 9 | 8 | 6 | 5 | -1 |
| 8. C9–C13 branched alkyl benzene sulfonic acid mixture (average C11.3), sold by Stephen Chemical as BioSoft H100 | 2 | 8 | 7 | 6 | 5 | -1 |
| 9. C9–C14 linear alkyl benzene sulfonic acid mixture (average C11.3), sold by Pilot Chemical as CalSoft LAS | 1 | 7 | 7 | 6 | 6 | 0 |
| 10. C10–C14 linear alkyl benzene sulfonic acid mixture (average C13), sold by Pilot Chemical as CalSoft TSA | 1 | 8 | 7 | 7 | 6 | -1 |
| 11. C12 linear alkyl benzene sulfonic acid (average C11.5), sold by Witco as 1298 Soft Acid | 2 | 7 | 7 | 5 | 5 | 0 |
| 12. C12 branched alkyl benzene sulfonic acid (average C11.5), sold by Witco as 1298 Hard Acid | 3 | 8 | 6 | 5 | 3 | -2 |
| 13. C13 linear alkyl benzene sulfonic acid (average C12.5), sold by Witco as 1398 Soft Acid | 2 | 7 | 6 | 5 | 4 | -1 |
| 14. C13 linear alkyl benzene sulfonic acid (average C12.5), sold by Witco as 1398 Hard Acid | 4 | 10 | 6 | 6 | 2 | -4 |
| 15. C20–C24 linear alkyl benzene sulfonic acid sold by Witco as Witco 2490 Acid | 3 | 9 | 4 | 6 | 1 | -5 |
| 16. Example 11 combined with 5% wt. isopropanol | 1 | 6 | 6 | 5 | 5 | 0 |
| 17. Example 11 combined with 5% wt. water | 3 | 8 | 7 | 5 | 4 | -1 |
| 18. Example 11 combined with .1% wt. Triton X-45 surfactant | 2 | 9 | 9 | 7 | 7 | 0 |
| 19. Example 11 combined with .1% wt. Triton X-100 surfactant | 2 | 9 | 9 | 7 | 7 | 0 |
| 20. Example 11 combined with .2% wt. Cyanox 2246,2,2-Methylene-bis(4-methyl-6 tert-butyl)phenol) antioxidant | 4 | 9 | 9 | 5 | 5 | 0 |
| 21. Example 11 combined with 5% wt. glacial acetic acid | 4 | 10 | 9 | 6 | 5 | -1 |
| 22. Example 11 combined with 3% wt. zinc stearate thickener | 3 | 8 | 8 | 5 | 5 | 0 |
| 23. Example 11 combined with .1% wt. fine powdered graphite lubricant | 3 | 9 | 4 | 6 | 1 | -5 |
| 24. Example 11 combined with 5% wt. HiPlast | 2 | 7 | 3 | 5 | 1 | -4 |
| 25. Example 11 combined with 5% wt. N-methyl-2-pyrrolidone | 1 | 7 | 5 | 6 | 4 | -2 |
| 26. Example 11 combined with 5% wt. gamma-butyrolactone | 2 | 8 | 6 | 7 | 4 | -2 |
| 27. Example 11 combined with 5% wt. diethylene glycol | 3 | 9 | 4 | 6 | 1 | -5 |
| 28. Example 11 combined with 2 butoxethanol | 4 | 10 | 6 | 6 | 2 | -4 |
| 29. Example 11 combined with 5% wt. formic acid | 3 | 8 | 5 | 5 | 2 | -3 |
| 30. Example 11 combined with 5% wt. hydrochloric acid | 3 | 7 | 5 | 4 | 2 | -2 |
| 31. Example 11 combined with 5% wt. glycerin | 1 | 6 | 6 | 5 | 5 | 0 |
| 32. Water combined with 10% wt. formic acid | 2 | 7 | 4 | 5 | 2 | -3 |
| 33. Water combined with 10% wt. sulfuric acid | 2 | 8 | 5 | 4 | 3 | -1 |
| 34. Water combined with 10% wt. hydrochloric acid | 1 | 6 | 5 | 5 | 4 | -1 |
| 35. Example 11 neutralized to pH of 2.5 | 1 | 7 | 5 | 6 | 4 | -2 |
| 36. Example 11 neutralized to pH of 3.5 | 2 | 8 | 4 | 6 | 2 | -4 |
| 37. Example 11 neutralized to pH of 4.5 | 2 | 7 | 3 | 5 | 1 | -4 |
| 38. Example 11 combined with 10% wt. of an amine salt (sold by Witco as Witconate T 1059) | 3 | 6 | 4 | 3 | 1 | -2 |
| 39. Example 11 combined with 90% wt. of isopropanol | 3 | 8 | 8 | 5 | 5 | 0 |

A* is an untreated wiper blade.
B* is a wiper blade treated with the composition of Example 11.
C* is a wiper blade treated with the Example indicated.
D* is the value of column B minus the value of column A.
E* is the value of column C minus the value of column A.
F* is comparative score wherein minus 5 is the poorest value and 0 is the best value, and is the value of column E minus the value of column D.

As noted above, the values in columns A–E are on a scale of from 1 to 10, with 1 being the worst and 10 being the best with regard to no streaking on a windshield. Moreover, a comparative score is set forth with regard to generally the best example, i.e., Example 11, with a comparative score of −5, meaning poor results and a score of 0 meaning good results in comparison therewith.

As apparent from the above examples, Example 11 which contained a linear alkyl benzene sulfonic acid wherein the alkyl group had an average of 11.5 carbon atoms yields the best results. The inorganic acids also gave favorable results.

It is to be understood that although the present invention has been specifically disclosed with the preferred embodiment and examples, modifications to the experimental design may be apparent to those skilled in the art and such modifications and variations are considered to be within the scope of the invention and the appended claims. It is also intended that all matter contained in the above description shall be interpreted as illustrative and not in a limiting sense, the scope of the invention being indicated by the appended claims rather than by the foregoing description, and all changes that come within the meaning and range of equivalency of the claims are therefore intended to be embraced therein. That is, the following claims are intended to cover all of the generic and specific features of the invention herein described, and all statements of the scope of the invention which, as a matter of language, fall therebetween.

What is claimed is:

1. A process for treating a rubber, a thermoplastic elastomer, or a plastic wiper blade comprising;

applying a composition including one or more sulfonic acids or salt thereof to the wiping surface of said wiper blade, said sulfonic acid.

2. A process according to claim 1, wherein said sulfonic acid is an alkyl sulfonic acid of the formula $$R^1\text{---}SO_3H \qquad \text{Formula I}$$

wherein $R^1$ contains from 2 to 36 carbon atoms, or an aromatic sulfonic acid having the formula

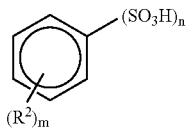

or combinations thereof, or a metal salt of said alkyl sulfonic acid or said aromatic sulfonic acid, wherein m is an integer of 1 to 4, n is an integer of from 1 to 4, with the proviso that m+n is 6 or less, wherein each $R^2$, independently, is an alkyl having from 1 to 30 carbon atoms and optionally contains at least one halogen, nitro, alcohol, carbonyl, or carboxyl group thereon, or combinations thereof.

3. A process according to claim 2, wherein each said $R^2$ group has a total of from about 9 to about 13 carbon atoms.

4. A process according to claim 3, wherein said sulfonic acid is said aromatic sulfonic acid, or an alkali metal or an amine salt thereof, or combinations thereof.

5. A process according to claim 4, wherein said composition further includes one or more diluents.

6. A process according to claim 4, wherein said composition further includes one or more water miscible solvents, or one or more acids other than said sulfonic acid, or one or more agents to adjust the viscosity of said composition, or one or more rubber protectorants to protect said rubber, said thermoplastic elastomer, or said plastic wiper blade from oxidation, or one or more neutralizers, or one or more plasticizers or softeners, or combinations thereof.

* * * * *

UNITED STATES PATENT AND TRADEMARK OFFICE
CERTIFICATE OF CORRECTION

PATENT NO. : 7,045,023 B1
APPLICATION NO. : 08/665491
DATED : May 16, 2006
INVENTOR(S) : Ronald A. Kramer It is certified that error appears in the above-identified patent and that said Letters Patent is hereby corrected as shown below:

Column 9,

Claim 1, line 26, after sulfonic acid, the last part of the claim was left off, --having from about 2 to about 36 carbon atoms. --

Signed and Sealed this

Eighteenth Day of July, 2006

JON W. DUDAS
*Director of the United States Patent and Trademark Office*